(12) United States Patent
Tazume et al.

(10) Patent No.: US 11,656,633 B2
(45) Date of Patent: May 23, 2023

(54) DETERMINING METHOD OF ARTICLE TRANSFER PLACE, DETERMINING METHOD OF LANDING PLACE, ARTICLE TRANSFER SYSTEM, AND INFORMATION PROCESSING DEVICE

(71) Applicant: Rakuten Group, Inc., Tokyo (JP)

(72) Inventors: Toshiaki Tazume, Tokyo (JP); Qingnan Zhou, Tokyo (JP); Hayato Mizukami, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 236 days.

(21) Appl. No.: 16/761,694

(22) PCT Filed: Dec. 7, 2018

(86) PCT No.: PCT/JP2018/045110
§ 371 (c)(1),
(2) Date: May 5, 2020

(87) PCT Pub. No.: WO2020/115902
PCT Pub. Date: Jun. 11, 2020

(65) Prior Publication Data
US 2021/0208603 A1 Jul. 8, 2021

(51) Int. Cl.
*G05D 1/06* (2006.01)
*B64C 39/02* (2023.01)
(Continued)

(52) U.S. Cl.
CPC ......... *G05D 1/0676* (2013.01); *B64C 39/024* (2013.01); *G05D 1/0027* (2013.01);
(Continued)

(58) Field of Classification Search
CPC .............. G05D 1/0676; G05D 1/0027; G05D 2201/0213; G05D 1/0282; G05D 1/0684;
(Continued)

(56) References Cited

U.S. PATENT DOCUMENTS 9,701,408 B1 * 7/2017 Willison ................ G08G 5/025
9,792,576 B1 * 10/2017 Jamjoom .............. B64C 39/024
(Continued)

FOREIGN PATENT DOCUMENTS

EP        3246776 A1    11/2017
JP       2016-071677 A    5/2016
(Continued)

OTHER PUBLICATIONS

International Search Report for PCT/JP2018/045110 dated Mar. 5, 2019 [PCT/ISA/210].

*Primary Examiner* — Aniss Chad
*Assistant Examiner* — Christine Nguyen Huynh
(74) *Attorney, Agent, or Firm* — Sughrue Mion, PLLC

(57) ABSTRACT

The article transfer system S selects an article transfer candidate on the basis of first sensing information obtained from first sensing performed by the unmanned aerial vehicle in flight, performs a movement control of the unmanned ground vehicle on the basis of position information of the selected article transfer candidate, and determines an article transfer place with reference to the selected article transfer candidate on the basis of second sensing information obtained from second sensing performed by the unmanned ground vehicle.

19 Claims, 12 Drawing Sheets

(51) Int. Cl.
*G05D 1/00* (2006.01)
*G06Q 10/0832* (2023.01)
*B64U 101/60* (2023.01)

(52) U.S. Cl.
CPC ..... *G06Q 10/0832* (2013.01); *B64U 2101/60* (2023.01); *B64U 2201/10* (2023.01); *B64U 2201/20* (2023.01)

(58) Field of Classification Search
CPC ............ G05D 1/0094; G06Q 10/0832; G06Q 10/083; B64C 39/02; B64C 2201/128; B64C 2201/141; B64C 2201/146; B64C 2201/027; B64C 2201/123; B64C 2201/127; B64C 2201/145; B64C 13/18
See application file for complete search history.

(56) References Cited

U.S. PATENT DOCUMENTS

| | | | |
|---|---|---|---|
| 10,395,544 B1 * | 8/2019 | Harris | B64F 1/007 |
| 2016/0257401 A1 | 9/2016 | Buchmueller et al. | |
| 2018/0037322 A1 | 2/2018 | Buchmueller et al. | |
| 2018/0107209 A1 | 4/2018 | Hardee et al. | |
| 2018/0148016 A1 | 5/2018 | Rous et al. | |
| 2018/0215376 A1 | 8/2018 | Kuhara | |
| 2018/0261112 A1 * | 9/2018 | O'Brien | G05D 1/0094 |
| 2018/0286256 A1 | 10/2018 | Yoshifuku et al. | |

FOREIGN PATENT DOCUMENTS

| | | |
|---|---|---|
| JP | 2016-153337 A | 8/2016 |
| JP | 2017-206072 A | 11/2017 |
| JP | 2018-070334 A | 5/2018 |
| JP | 2018-513456 A | 5/2018 |
| JP | 2018-514478 A | 6/2018 |
| JP | 2018-122650 A | 8/2018 |
| JP | 2018-527488 A | 9/2018 |
| JP | 2018-165870 A | 10/2018 |
| WO | 2015/061008 A1 | 4/2015 |
| WO | 2017/195325 A1 | 11/2017 |
| WO | 2017/198696 A2 | 11/2017 |
| WO | WO-2017198696 A2 * | 11/2017 |

* cited by examiner

DETERMINING METHOD OF ARTICLE TRANSFER PLACE, DETERMINING METHOD OF LANDING PLACE, ARTICLE TRANSFER SYSTEM, AND INFORMATION PROCESSING DEVICE

CROSS REFERENCE TO RELATED APPLICATIONS

This application is a National Stage of International Application No. PCT/JP2018/045110 filed Dec. 7, 2018.

TECHNICAL FIELD

The present invention relates to a field such as a system capable of transferring an article between an unmanned aerial vehicle and an unmanned ground vehicle.

BACKGROUND ART

In recent years, an unmanned delivery system using an unmanned aerial vehicle or an unmanned ground vehicle has been studied (for example, Patent Literature 1). The unmanned aerial vehicle can fly without being affected by road conditions on the ground or the like, but landing places are limited. Therefore, it is often difficult to carry the article to the final delivery destination (for example, each home) or to receive the article to be transported from a shipper. On the other hand, the unmanned ground vehicle is more likely to be affected by road conditions on the ground and the like, but is capable of transporting articles near to a delivery destination and the shipper.

CITATION LIST

Patent Literature

Patent Literature 1: JP 2018-514478 A

SUMMARY OF INVENTION

Technical Problem

In view of the above circumstances, in the future unmanned delivery systems or the like, the unmanned aerial vehicle and the unmanned ground vehicle will individually move to a predetermined transfer place, and at the transfer place, the article is transferred from the unmanned aerial vehicle to the unmanned ground vehicle. Alternatively, the article is transferred from the unmanned ground vehicle to the unmanned aerial vehicle. However, in the transfer of the article between the unmanned aerial vehicle and the unmanned ground vehicle (hereinafter, referred to as "article transfer"), it may be difficult to safely transfer the article depending on the surrounding environment such as in a case where there are people around. In addition, when the unmanned aerial vehicle lands on the unmanned ground vehicle and tries to transfer the article, or when it is desired to supply power from the unmanned ground vehicle to the unmanned aerial vehicle, it may be difficult that the unmanned aerial vehicle safely lands on the unmanned ground vehicle depending on the surrounding environment. In addition, it is also possible to prepare dedicated delivery facilities (for example, land with fences to prevent human intrusion and the like) for the article transfer, and dedicated landing facilities for the unmanned aerial vehicle to land on the unmanned ground vehicle. However, in a case where such a dedicated facility does not exist near the unmanned ground vehicle, it becomes difficult to safely transfer the article between the unmanned aerial vehicle and the unmanned ground vehicle and land safely on the unmanned ground vehicle for the unmanned aerial vehicle.

Therefore, one or more embodiments of the present invention are directed to provide a determining method of an article transfer place, an article transfer system, and an information processing device which can secure a transfer place where an article can be safely transferred between the unmanned aerial vehicle and the unmanned ground vehicle even in a case where a dedicated transfer facility does not exist. Moreover, one or more embodiments of the present invention provide a determining method of a landing place which enables to secure a landing place where the unmanned aerial vehicle can safely land on the unmanned ground vehicle even in a case where a dedicated landing facility does not exist.

Solution to Problem

In accordance with certain embodiments of the present disclosure, a determining method of an article transfer place performed by a system which includes an unmanned aerial vehicle and an unmanned ground vehicle is provided. The determining method includes: a selection step of selecting a candidate of a place for an article transfer performed between the unmanned aerial vehicle and the unmanned ground vehicle on the basis of information obtained from first sensing performed by the unmanned aerial vehicle in flight; a control step of performing a movement control of the unmanned ground vehicle on the basis of information of the candidate; and a determination step of determining an article transfer place with reference to the candidate, on the basis of information obtained from second sensing performed by the unmanned ground vehicle. Accordingly, even in a case where there is no dedicated transfer facility, it is possible to secure the transfer place where an article can be safely transferred between the unmanned aerial vehicle and the unmanned ground vehicle.

In certain aspects, a search is made for a space where the unmanned ground vehicle can stop for a predetermined time or more with reference to the candidate, and the searched space or a point in the searched space is determined as the article transfer place. This makes it possible to determine a safer article transfer place.

In certain aspects, a search is made for a space in which an obstacle to the article transfer does not exist on the ground and in the sky with reference to the candidate, and the searched space or a point in the searched space is determined as the article transfer place. This makes it possible to determine a safer article transfer place.

In certain aspects, the article transfer place is determined on the basis of information obtained from the second sensing while the unmanned ground vehicle is moving according to the movement control. This makes it possible to more efficiently determine the article transfer place.

In certain aspects, the article transfer place is determined on the basis of information obtained from third sensing performed by a sensor installed on the ground in addition to the information obtained from the second sensing. This makes it possible to improve sensing accuracy, and it is possible to determine a more suitable article transfer place.

In certain aspects, the article transfer place is determined on the basis of a past transfer history in addition to the information obtained from the second sensing. This makes it possible to determine an optimal article transfer place based on past determination results.

In certain aspects, a search is made for a space where the unmanned ground vehicle can stop for a predetermined time or more, and the searched space or a point in the searched space is selected as the candidate. This makes it possible to select a safer candidate of a place for the article transfer.

In certain aspects, a search is made for a space in which an obstacle to the article transfer does not exist on the ground and in the sky, and a searched space or a point in the searched space is selected as the candidate. This makes it possible to select a safer candidate of a place for the article transfer.

In certain aspects, the candidate of the article transfer place is selected on the basis of information obtained from third sensing performed by a sensor installed on the ground in addition to the information obtained from the first sensing. This makes it possible to improve sensing accuracy, and it is possible to select a more suitable candidate of a place for the article transfer.

In certain aspects, the candidate of the article transfer place is selected on the basis of a past transfer history in addition to the information obtained from the first sensing. This makes it possible to determine an optimal candidate of a place for the article transfer based on past selection results.

In certain aspects, a plurality of candidates for the article transfer place is selected on the basis of the information obtained from the first sensing, and the unmanned ground vehicle is controlled to move in an order of the candidates according to a predetermined criterion. This makes it possible to more efficiently determine the article transfer place.

In certain aspects, the unmanned ground vehicle is controlled to move in an order of the candidates closer to a delivery destination of an article. This makes it possible to deliver the article to the delivery destination more quickly.

In certain aspects, the unmanned ground vehicle is controlled to move in an order of the candidates closer to a current position of the unmanned ground vehicle. This makes it possible to determine the article transfer place more quickly.

In certain aspects, the unmanned ground vehicle is controlled to move in a moving order according to a density of the plurality of candidates. This makes it possible to determine the article transfer place that is estimated to be more secure.

In certain aspects, the method further includes: a step of causing the unmanned aerial vehicle to fly to the determined article transfer place. This makes it possible to guide the unmanned aerial vehicle to a safer article transfer place.

In certain aspects, the method further includes: a step of causing the unmanned aerial vehicle and the unmanned ground vehicle to perform the article transfer at the determined article transfer place. This makes it possible to perform the article transfer between the unmanned aerial vehicle and the unmanned ground vehicle at a more secure article transfer place.

In certain aspects, the method further includes: a step of outputting an alarm in a case where an approach of a moving object to the determined article transfer place is detected. This makes it possible to enhance safety of the determined article transfer place.

In accordance with other embodiments of the present disclosure, an article transfer system which includes an unmanned aerial vehicle and an unmanned ground vehicle is provided. The article transfer system includes: a selection unit which selects a candidate of a place for an article transfer performed between the unmanned aerial vehicle and the unmanned ground vehicle on the basis of information obtained from first sensing performed by the unmanned aerial vehicle in flight; a movement control unit which performs a movement control of the unmanned ground vehicle on the basis of information of the candidate; and a determination unit which determines an article transfer place with reference to the candidate on the basis of information obtained from second sensing performed by the unmanned ground vehicle.

In accordance with still other embodiments of the present disclosure, an information processing device included in a system which includes an unmanned aerial vehicle and an unmanned ground vehicle is provided. The information processing device includes: a selection unit which selects a candidate of a place for an article transfer performed between the unmanned aerial vehicle and the unmanned ground vehicle on the basis of information obtained from first sensing performed by the unmanned aerial vehicle in flight; a movement control unit which causes the unmanned ground vehicle to perform a movement control on the basis of information of the candidate; and a determination unit which determines an article transfer place with reference to the candidate on the basis of information obtained from second sensing performed by the unmanned ground vehicle.

In accordance with yet other embodiments of the present disclosure, a determining method of a landing place performed by a system which includes an unmanned aerial vehicle and an unmanned ground vehicle is provided. The determining method includes: a selection step of selecting a candidate of a landing place for the unmanned aerial vehicle to land on the unmanned ground vehicle on the basis of information obtained from first sensing performed by the unmanned aerial vehicle in flight; a control step of performing a movement control of the unmanned ground vehicle on the basis of information of the candidate; and a determination step of determining the landing place with reference to the candidate on the basis of information obtained from second sensing performed by the unmanned ground vehicle. Accordingly, even in a case where there is no dedicated landing facility, it is possible to secure the landing place where the unmanned aerial vehicle can safely land on the unmanned ground vehicle.

Advantageous Effect of the Invention

According to one or more embodiments of the present invention, it is possible to secure the transfer place where an article can be safely transferred between the unmanned aerial vehicle and the unmanned ground vehicle even in a case where a dedicated transfer facility does not exist. Moreover, according to one or more embodiments of the present invention, it is possible to secure the landing place where the unmanned aerial vehicle can safely land on the unmanned ground vehicle even in a case where a dedicated landing facility does not exist.

DESCRIPTION OF EMBODIMENTS

Hereinafter, an article transfer system according to an embodiment of the invention and a determining method of an article transfer place performed by the article transfer system will be described with reference to the drawings.

[1. Outline of Configuration of Article Transfer System S and Determining Method of Article Transfer Place]

Figure 1:
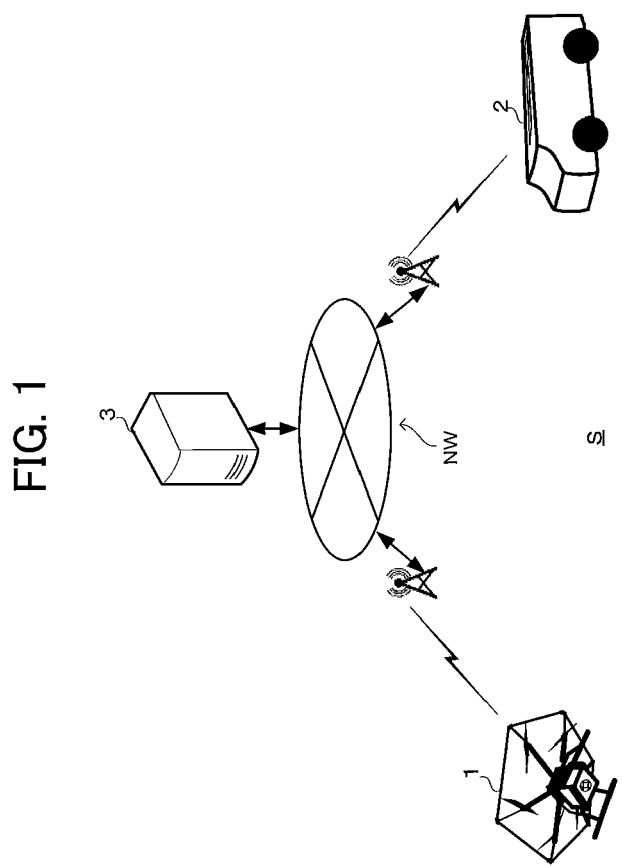
FIG. 1 is a diagram illustrating a schematic configuration example of an article transfer system S.

First, the outline of the configuration of an article transfer system S according to this embodiment and the determining method of the article transfer place will be described with reference to FIG. 1. FIG. 1 is a diagram illustrating a schematic configuration example of the article transfer system S. As illustrated in FIG. 1, the article transfer system S includes an unmanned aerial vehicle (hereinafter, referred to as "UAV (Unmanned Aerial Vehicle)") 1 which flies in the atmosphere (in the air), an unmanned ground vehicle (hereinafter, "UGV (Unmanned Ground Vehicle)") 2 which moves on the ground, and a server 3 which supports the article transfer. The UAV 1 and the UGV 2 each can communicate with the server 3 via a communication network NW. Herein, "moving on the ground" means that at least a part of the body of the UGV 2 moves while in contact with the ground (including a case where the UGV 2 is momentarily separated from the ground and floats in the air). The communication network NW includes, for example, the Internet, a mobile communication network, a radio base station thereof, and the like. Wireless communication is performed between a radio base station and the UAV 1, and between the radio base station and the UGV 2.

Incidentally, the UAV 1 illustrated in FIG. 1 is also called a drone or a multicopter. Although the UGV 2 of FIG. 1 illustrates an unmanned ground vehicle having a plurality of wheels, the UGV 2 may be a robot having no wheels (for example, a bipedal walking robot). The server 3 is an example of an information processing device. In the example of FIG. 1, it is assumed that the server 3 is fixedly installed independently of the UAV 1 and the UGV 2, but all or part of the functions of the server 3 may be provided to both or any one of the UAV 1 and the UGV 2. In this case, all or part of the processing performed by the server 3 (each step in the determining method of the article transfer place) is performed by both or any one of the UAV 1 and the UGV 2.

In the article transfer system S, the UAV 1 and the UGV 2 individually move to the article transfer place, and the article is transferred from the UAV 1 to the UGV 2 at the article transfer place, or the article is transferred from the UGV 2 to the UAV 1. The article transferred in this way is, for example, a cargo delivered by the UAV 1 and the UGV 2. For example, the UGV 2 autonomously moves on the ground on the basis of delivery destination information of the article received from the UAV 1 at the article transfer place, and delivers the article to a delivery destination. Alternatively, the UAV 1 delivers the article to the delivery destination by autonomously flying in the air on the basis of the delivery destination information of the article transferred from the UGV 2 at the article transfer place. Moreover, the UAV 1 may transport the article transferred from the UGV 2 at an article transfer place to another article transfer place. In this case, the article is transferred from the UAV 1 to the other UGV 2 at the other article transfer place, and the article is delivered to the delivery destination by the other UGV 2. Incidentally, the article transferred from the UGV 2 to the UAV 1 may be an article necessary for the UAV 1 to fly (for example, a supplementary battery that supplies power to the UAV 1 and the like).

The determining method of the article transfer place performed by the article transfer system S includes a selection step, a control step, and a determination step. In the selection step, a candidate of the place of the article transfer (hereinafter, referred to as "article transfer candidate") performed between the UAV 1 and the UGV 2 is selected on the basis of the information obtained from first sensing performed by the UAV 1 in flight (hereinafter, referred to as "first sensing information"). Herein, the first sensing refers to measuring (observing) the situation of the atmosphere and the ground (including objects that are in contact with the ground or the like; the same shall apply hereafter) in the ground direction from the viewpoint of the UAV 1. According to the first sensing, although there is a case where it is difficult to observe the situation of the ground in detail because the blind spot of the UAV or the like 1 is likely to occur, it is possible to observe the situation of the ground from above in a bird's-eye view. Therefore, the first sensing is suitable for selecting the article transfer candidate.

In the control step, the movement control of the UGV 2 is performed on the basis of the information (for example, position information) of the selected article transfer candidate. Then, in the determination step, the article transfer place is determined with reference to the selected article transfer candidate on the basis of the information obtained from second sensing performed by the UGV 2 (hereinafter, referred to as "second sensing information"). Herein, the second sensing refers to observing the situation of the atmosphere and the ground in all directions (excluding the lower direction of the UGV 2) or the traveling direction from the viewpoint of the UGV 2. According to the second sensing, the situation around the UGV 2 itself can be observed in detail (it is easy to observe the situation on the ground regardless of the blind spot of the UAV 1), and the UGV 2 can perform sensing while moving. Therefore, the second sensing is suitable for determining the final article transfer place.

Incidentally, in the above selection step, in addition to the first sensing information, it may be configured such that the article transfer candidate is selected on the basis of the information (hereinafter, referred to as "third sensing information") obtained from third sensing performed by a sensor such as a camera (hereinafter, referred to as an "outdoor sensor") installed on the ground and connected to the communication network NW. Similarly, even in the determination step, the article transfer place may be determined on the basis of the third sensing information obtained the third sensing performed by the outdoor sensor in addition to the second sensing information. Herein, the third sensing refers to observing, for example, the situation of the atmosphere and the ground in all directions from the viewpoint of the outdoor sensor. Although a sensing range of the outdoor sensor is limited, it has an advantage that it is easier to observe the situation of the ground compared to the first sensing, and it covers the situation which is not able to be observed with the second sensing (such as the blind spot of the UGV 2). Therefore, the accuracy of sensing can be improved by utilizing the third sensing information in any of the selection of the article transfer candidate and the final determination of the article transfer place. As a result, a more suitable article transfer candidate can be selected, and a more suitable article transfer place can be determined.

However, since outdoor cameras are fixedly installed with respect to the ground in general, blind spots are likely to occur, and it is desired that the final determination of the article transfer place also requires the second sensing information. Incidentally, the outdoor sensor may be, for example, an infrared sensor, a laser sensor, a thermal sensor, a microphone, an ultrasonic sensor, a LiDAR (Light Detection and Ranging), a human sensor, a wind speed sensor, or the like other than the camera. Furthermore, in the determination step, the article transfer place may be determined using not only the second sensing information but also the first sensing information. According to this configuration, the situation in the article transfer candidate can be observed from both the sky side and the ground side, so that the accuracy of sensing can be improved, and as a result, a more suitable article transfer place can be determined.

[1-1. Outline of Configuration and Function of UAV 1]

Figure 2:
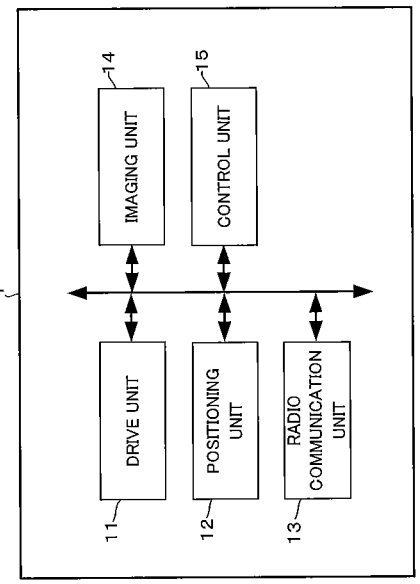
FIG. 2 is a diagram illustrating a schematic configuration example of an UAV 1.

Next, the outline of the configuration and function of the UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a radio communication unit 13, an imaging unit 14, a control unit 15, and the like. Incidentally, while not illustrated, the UAV 1 includes a rotor (propeller) that is a horizontal rotary blade, various sensors, an article holding mechanism, and a battery or the like that supplies power to each part of the UAV 1. Various sensors used for flight control of the UAV 1 include a barometric sensor, a three-axis acceleration sensor, a geomagnetic sensor, and the like. Detection information detected by the various sensors is output to the control unit 15.

The drive unit 11 includes a motor, a rotation shaft, and the like. The drive unit 11 rotates a plurality of rotors by a motor, a rotation shaft, and the like that are driven according to a control signal output from the control unit 15. The positioning unit 12 includes a radio waver receiver, an altitude sensor, and the like. For example, the positioning unit 12 receives a radio wave transmitted from a GNSS (Global Navigation Satellite System) satellite by the radio wave receiver, and detects the current position (latitude and longitude) of the UAV 1 in the horizontal direction on the basis of the radio wave. The current position of the UAV 1 is the flight position of the UAV 1 in flight. Incidentally, the current position in the horizontal direction of the UAV 1 may be corrected on the basis of an image captured by the imaging unit 14 or a radio wave transmitted from the radio base station. Further, the positioning unit 12 may detect the current position (altitude) in the vertical direction of the UAV 1 using the altitude sensor. Position information indicating the current position detected by the positioning unit 12 is output to the control unit 15.

The radio communication unit 13 controls communication performed via the communication network NW. The imaging unit 14 includes a camera and the like. In addition to the flight control of the UAV 1, the camera is used as a sensor for the first sensing. The imaging unit 14 continuously captures a real space within a range that falls within the angle of view of the camera. Image information captured by the imaging unit 14 is output to the control unit 15. Incidentally, for the first sensing, the UAV 1 may be provided with at least one sensor (sensor device) such as an infrared sensor, a laser sensor, a thermal sensor, a microphone, an ultrasonic sensor, a LiDAR, a human sensor, and a wind speed sensor.

The control unit 15 includes a central processing unit (CPU) which is a processor, a read only memory (ROM), a random access memory (RAM), a non-volatile memory, and the like. The control unit 15 performs the first sensing program during the flight of the UAV 1 using the camera or the like of the imaging unit 14 according to a sensing program (program code group) stored in, for example, the ROM or the non-volatile memory. The control unit 15 transmits the first sensing information obtained from the first sensing to the server 3 together with the aircraft ID (identification information) of the UAV 1 through the radio communication unit 13 at predetermined time intervals. The first sensing information transmitted at this time may be raw data output from the sensor used for the first sensing, or may be information indicating a result of an analysis process (for example, information indicating the result of object detection processing, etc.) performed based on the output raw data. For example, in a case where the camera of the imaging unit 14 is used for the first sensing, image information or information indicating a result of the analysis process performed based on the image information (for example, position information of a detected obstacle) is transmitted as the first sensing information. The analysis process in this case is performed by the control unit 15. However, in a case where a sensor having an analysis processing function (for example, a human sensor) is mounted on the UAV 1, the analysis processing may be performed by the sensor. Incidentally, during the flight of the UAV 1, the control unit 15 may periodically transmit the position information of the UAV 1 to the server 3 via the radio communication unit 13 together with the aircraft ID of the UAV 1.

Moreover, the control unit 15 performs various controls of the UAV 1 according to a control program stored in, for example, the ROM or the non-volatile memory. The various controls include take-off control, flight control, landing control, and article transfer control. In the flight control and the landing control, the position information acquired from the positioning unit 12, the image information acquired from the imaging unit 14, detection information acquired from various sensors, the position information on the article transfer place determined in the determination step, delivery destination information of the article, and pre-registered flight plan information (for example, including a flight scheduled route) are used to control the number of rotations of the rotor and the position, posture, and traveling direction of the UAV 1. Herein, the position information of the article transfer place is acquired from the server 3, for example. The control unit 15 can cause the UAV 1 to fly to the article transfer place on the basis of the position information of the article transfer place. Moreover, the autonomous flight of the UAV 1 is not limited to the autonomous flight in which the control unit 15 provided in the UAV 1 performs flight control. The autonomous flight of the UAV 1 includes, for example, an autonomous flight by performing autonomous control as the entire article transfer system S.

Incidentally, the position information of the article transfer place may be acquired from a GCS (Ground Control Station) that manages the UAV 1 and can be remotely operated from the ground. In this case, the GCS acquires the position information of the article transfer place of the article from the server 3. For example, the GCS may be installed in a control terminal that can be connected to the communication network NW as an application, or may be systemized by a server or the like. The control unit 15 can also perform flight control according to an instruction signal from a control terminal operated by an operator. On the other hand, in the article transfer control, control for providing the article held by the article holding mechanism to the UGV 2 is performed. By this configuration, the article is transferred from the UAV 1 to the UGV 2. Alternatively, in the article transfer control, control for holding the article provided from the UGV 2 by the article holding mechanism is performed. By this configuration, the article is transferred from the UGV 2 to the UAV 1.

[1-2. Outline of Configuration and Function of UGV 2]

Figure 3:
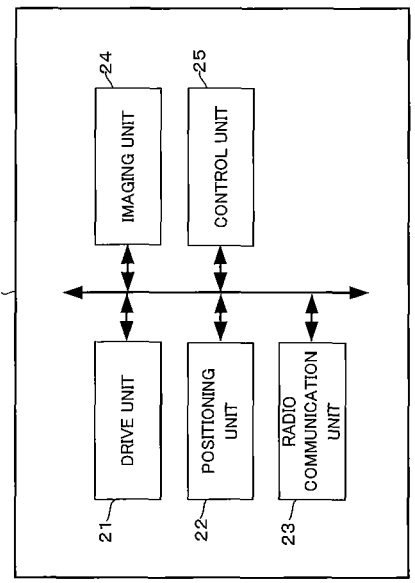
FIG. 3 is a diagram illustrating a schematic configuration example of an UGV 2.

Next, the outline of the configuration and function of the UGV 2 will be described with reference to FIG. 3. FIG. 3 is a diagram illustrating a schematic configuration example of the UGV 2. As illustrated in FIG. 3, the UGV 2 includes a drive unit 21, a positioning unit 22, a radio communication unit 23, an imaging unit 24, a control unit 25, and the like. Incidentally although not illustrated, the UGV 2 includes wheels, an article holding mechanism, a speaker, a battery that supplies power to each unit of the UGV 2, and the like. The UGV 2 may be capable of loading a plurality of articles.

The drive unit 21 includes a motor, a rotation shaft, and the like. The drive unit 21 rotates a plurality of wheels by a motor, a rotation shaft, and the like that are driven according to a control signal output from the control unit 25. Incidentally, the drive unit 21 may include an engine driven by fuel together with or instead of the motor. The positioning unit 22 includes a radio wave receiver and the like. The positioning unit 22 receives, for example, a radio wave transmitted from a GNSS satellite by the radio wave receiver, and detects the current position (latitude and longitude) of the UGV 2 on the basis of the radio wave. Incidentally, the current position of the UGV 2 may be corrected on the basis of an image captured by the imaging unit 24. Position information indicating the current position detected by the positioning unit 22 is output to the control unit 25.

The radio communication unit 23 controls communication performed via the communication network NW. The imaging unit 24 includes a camera and the like. In addition to the movement control of the UGV 2, the camera is used as a sensor for the second sensing. The imaging unit 24 continuously captures a real space within a range that falls within the angle of view of the camera. Image information captured by the imaging unit 24 is output to the control unit 25. Incidentally, for the second sensing, the UGV 2 may be provided with at least any one sensor (sensor device) such as an infrared sensor, a laser sensor, a thermal sensor, a microphone, an ultrasonic sensor, a LiDAR, a human sensor, and a wind speed sensor.

The control unit 25 includes a CPU which is a processor, a ROM, a RAM, a non-volatile memory, and the like. The control unit 25 performs the second sensing using the camera or the like of the imaging unit 24 according to a sensing program stored in the ROM or the non-volatile memory, for example. The control unit 25 transmits the second sensing information obtained from the second sensing to the server 3 together with the aircraft ID of the UGV 2 through the radio communication unit 23 at predetermined time intervals. The second sensing information transmitted at this time may be raw data output from the sensor used for the second sensing, or may be information indicating a result of analysis processing (for example, object detection processing, etc.) performed based on the output raw data. For example, in a case where the camera of the imaging unit 24 is used for the second sensing, image information or information indicating a result of the analysis processing performed based on the image information (for example, position information of a detected obstacle) is transmitted as the second sensing information. The analysis processing in this case is performed by the control unit 25. However, in a case where a sensor having an analysis processing function (for example, a human sensor) is mounted on the UGV 2, the analysis processing may be performed by the sensor. Incidentally, the control unit 25 may transmit the position information of the UGV 2 to the server 3 via the radio communication unit 23 together with the second sensing information.

Moreover, the control unit 25 performs various controls of the UGV 2 according to a control program stored in, for example, the ROM or the non-volatile memory. The various controls include movement control and article transfer control. In the movement control, the number of rotations of the wheels, and the position and traveling direction of the UGV 2 are controlled using the position information obtained from the positioning unit 22, the image information obtained from the imaging unit 24, the position information of the article transfer candidate selected in the selection step, and the delivery destination information of the article. Herein, the position information of the article transfer candidate is acquired from the server 3, for example. The control unit 25 functions as a movement control unit, and can control the UGV 2 so that the UGV 2 moves to the article transfer candidate on the basis of the position information of the article transfer candidate. While the UGV 2 is moving toward the article transfer candidate according to the movement control of the UGV 2, the server 3 determines the article transfer place for example. According to this configuration, it is possible to more efficiently determine the article transfer place. However, the movement amount of the UGV 2 by the movement control of the UGV 2 may be 0. As an example of such a case, there is a case where the UGV 2 is on the article transfer candidate and the article transfer candidate is determined as an article transfer place. Moreover, the autonomous movement of the UGV 2 is not limited to the autonomous movement by the movement control of the control unit 25 provided in the UGV 2. The autonomous movement of the UGV 2 includes, for example, an autonomous movement by performing autonomous control as the entire article transfer system S.

Incidentally, the determination of the article transfer place based on the second sensing information may be performed by the control unit 25. In this case, the control unit 25 transmits the position information of the determined article transfer place to the server 3 via the radio communication unit 23. Moreover, in a case where the approach of the moving object to the article transfer place determined based on the second sensing is detected, the control unit 25 outputs an alarm sound (alarm) from the speaker. Examples of the moving object include a person, an animal, a bicycle, a car, and the like. According to this configuration, it is possible to call attention to a person or the like approaching the article transfer place, and it is possible to enhance the safety of the determined article transfer place. The approach of the moving object can be detected by the second sensing that is continuously performed even after the determination of the article transfer place. Incidentally, the alarm output may be performed by means other than sound (for example, light). On the other hand, in the article transfer control, control for holding the article provided from the UAV 1 by the article holding mechanism is performed. Alternatively, in the article transfer control, control for providing the article held by the article holding mechanism to the UAV 1 is performed.

[1-3. Outline of Configuration and Function of Server 3]

Figure 4:
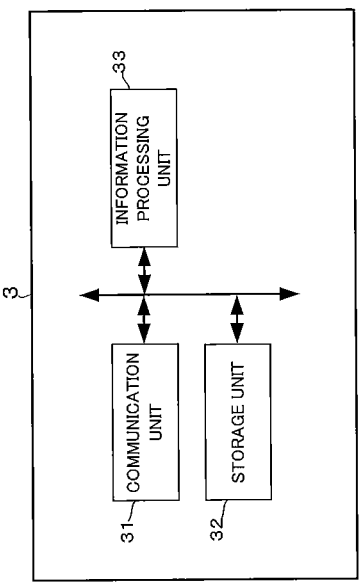
FIG. 4 is a diagram illustrating a schematic configuration example of a server 3.
Figure 5:
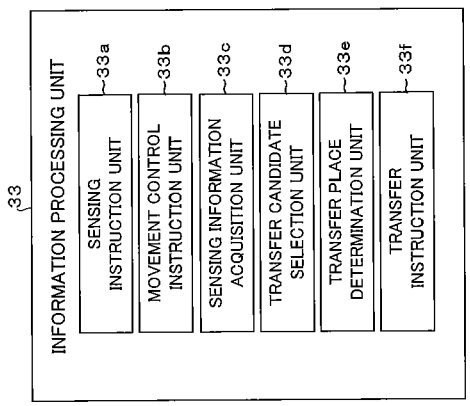
FIG. 5 is a diagram illustrating an example of functional blocks in an information processing unit 33.

Next, the outline of the configuration and function of the server 3 will be described with reference to FIGS. 4 and 5. FIG. 4 is a diagram illustrating a schematic configuration example of the server 3. As illustrated in FIG. 4, the server 3 includes a communication unit 31, a storage unit 32, an information processing unit 33, and the like. The communication unit 31 serves to control communication performed via the communication network NW. The storage unit 32 includes, for example, a hard disk drive, and the like. In the storage unit 32, transfer management information for managing the article transfer is stored separately for each article. The transfer management information includes, for example, the article ID of the article to be transferred, the individual aircraft IDs of the UAV 1 and the UGV 2 performing the article transfer, the position information of the article transfer candidate, the position information of the article transfer place, and the like, which are associated. The pair of the UAV 1 and the UGV 2 that transfer the article is determined before transferring the article. Incidentally, in a case where the article is a delivery target, the transfer management information may include the delivery destination information of the article. The delivery destination information of the article may include, for example, the latitude and longitude of the delivery destination or the location of the delivery destination. Moreover, in a case where the delivery destination is one room (one house) in a building such as an apartment house or an office, the delivery destination information may include the name of the building and the room number of the room to be delivered.

Moreover, the storage unit 32 stores transfer history information indicating a history (a past transfer history) of a transfer performed in the past. The transfer history information includes, for example, the article ID of the transferred article, the position information of the article transfer candidate, the position information of the article transfer place, the determination time of the article transfer place, and the like. Incidentally, the storage unit 32 may store map data of an article transfer area. The article transfer area is an area which includes an article transfer candidate to be selected. Such map data is used for selecting an article transfer candidate and determining an article transfer place.

The information processing unit 33 includes a CPU, a ROM, a RAM, a non-volatile memory that are processors, and the like. FIG. 5 is a diagram illustrating an example of functional blocks in the information processing unit 33. The information processing unit 33 functions as, as illustrated in FIG. 5, a sensing instruction unit 33a, a movement control instruction unit 33b, a sensing information acquisition unit 33c, a transfer candidate selection unit 33d, a transfer place determination unit 33e, and a transfer instruction unit 33f, for example, according to a program stored in a ROM or a non-volatile memory. Incidentally, the movement control instruction unit 33b is an example of a movement control unit. The transfer candidate selection unit 33d is an example of a selection unit. The transfer place determination unit 33e is an example of a determination unit.

For example, in a case where the UAV 1 approaches the article transfer area, the sensing instruction unit 33a transmits a first sensing instruction to the UAV 1 via the communication unit 31. The first sensing instruction is an instruction message for causing the UAV 1 to perform the first sensing in the article transfer area. Incidentally, the sensing instruction unit 33a may transmit a third sensing instruction to the outdoor sensor via the communication unit 31 while transmitting the first sensing instruction to the UAV 1. The third sensing instruction is an instruction message for causing the outdoor sensor to perform the third sensing in the article transfer area. Moreover, for example, in a case where an article transfer candidate is selected, the sensing instruction unit 33a transmits a second sensing instruction to the UGV 2 that performs article transfer via the communication unit 31. The second sensing instruction is an instruction message for causing the UGV 2 to perform the second sensing in the article transfer area. Incidentally, the sensing instruction unit 33a may transmit the third sensing instruction to the outdoor sensor via the communication unit 31 while transmitting the second sensing instruction to the UGV 2.

For example, in a case where an article transfer candidate is selected, the movement control instruction unit 33b transmits a movement control instruction to the UGV 2 that performs the article transfer via the communication unit 31, together with the position information of the selected article transfer candidate. The movement control instruction is an instruction message for causing the UGV 2 to perform the movement control based on the position information of the article transfer candidate. Incidentally, in a case where a plurality of article transfer candidates is selected, the movement control instruction includes an instruction to move the UGV 2 in an order of the article transfer candidates according to a predetermined criterion. As an example of the order of the article transfer candidates according to the predetermined criterion, there are the order of the article transfer candidates closer to the delivery destination of the article, the order of the article transfer candidates closer to the current position of the UGV 2, and the moving order according to the density of the plurality of article transfer candidates, and the like. Moreover, for example, in a case where the article transfer place is determined, the movement control instruction unit 33b transmits the movement control instruction together with the position information of the determined article transfer place to the UAV 1 that performs the article transfer via the communication unit 31. The movement control instruction is an instruction message for causing the UAV 1 to perform movement control based on the position information of the article transfer place (that is, causing the UAV 1 to fly to the article transfer place).

The sensing information acquisition unit 33c acquires the first sensing information obtained from the first sensing performed by the UAV 1 in response to the first sensing instruction from the UAV 1 together with the aircraft ID of the UAV 1 at, for example, a predetermined time interval. Moreover, the sensing information acquisition unit 33c acquires the second sensing information obtained from the second sensing performed by the UGV 2 in response to the second sensing instruction, together with the aircraft ID of the UGV 2, for example, at a predetermined time interval from the UGV 2. Further, the sensing information acquisition unit 33c may acquire the third sensing information obtained from the third sensing performed by the outdoor sensor in response to the third sensing instruction, for example, at predetermined time intervals from the outdoor sensor.

The transfer candidate selection unit 33d selects one or a plurality of article transfer candidates on the basis of the first sensing information acquired by the sensing information acquisition unit 33c. For example, the transfer candidate selection unit 33d generates a plurality of pieces of mapping image data representing a situation (in other words, an amount observed by sensing) extracted from the first sensing information in a time-series manner. The mapping image data corresponds to the article transfer area, and each point (pixel) of the mapping image data is associated with latitude and longitude. The transfer candidate selection unit 33d searches for a space (in other words, a small area) in which an obstacle to the article transfer does not exist on the ground and in the sky on the basis of the generated mapping image data. Then, the transfer candidate selection unit 33d selects the searched space or a point in the searched space as the article transfer candidate. According to this configuration, a safer article transfer candidate can be selected. Incidentally, the transfer candidate selection unit 33d acquires the position information of the selected article transfer candidate.

Moreover, the transfer candidate selection unit 33d may select one or more article transfer candidates on the basis of the third sensing information acquired by the sensing information acquisition unit 33c, in addition to the first sensing information acquired by the sensing information acquisition unit 33c. In this case, the transfer candidate selection unit 33d generates a plurality of pieces of mapping image data representing the situation extracted from the first sensing information and the situation extracted from the third sensing information in time series. Then, similarly to the above, the transfer candidate selection unit 33d searches for a space where an obstacle does not exist on the ground and in the sky on the basis of the generated mapping image data, selects the searched space or a point in the searched space as the article transfer candidate, and acquires the position information of the selected article transfer candidate.

Incidentally, the obstacle includes a person, an animal, a building, and other objects. The determination as to whether the obstacle is an obstacle is made, for example, by referring to data of an obstacle candidate registered in advance. A road on which a vehicle runs, a sidewalk on which a person walks, and the like may also be registered as obstacles. Moreover, the transfer candidate selection unit 33d may exclude buildings, roads, sidewalks, and the like from the search target by referring to map data corresponding to latitude and longitude with respect to the generated mapping image data. Moreover, the transfer candidate selection unit 33d may search for a space that has at least extent (an area) where the UGV 2 can stop and that the UGV 2 can stop for a predetermined time (for example, a time until the completion of article transfer). According to this configuration, a safer article transfer candidate can be selected.

Further, the transfer candidate selection unit 33d may select the article transfer candidate on the basis of the transfer history performed in the past, in addition to the first sensing information (or the first sensing information and the third sensing information) acquired by the sensing information acquisition unit 33c. According to this configuration, it is possible to select an optimum article transfer candidate based on past selection results. In this case, for example, the transfer candidate selection unit 33d refers to history information stored in the storage unit 32, and excludes the article transfer candidate that has not been determined as the article transfer place from the article transfer candidates selected in the past (that is, excluded from the search target) and selects the article transfer candidate among the article transfer candidates that has not been excluded. At this time, the excluded article transfer candidate may be an article transfer candidate whose frequency not determined as the article transfer place is equal to or higher than a threshold. Moreover, the history information referred to by the transfer candidate selection unit 33d may be history information indicating that the article transfer place is determined within a predetermined time zone (for example, 9:00-12:00) including the time (current time) at which the article transfer candidate is selected. This takes into account, for example, that the situation such as traffic varies depending on the time zone.

Incidentally, it is desirable that the first sensing information and the third sensing information used for selecting the article transfer candidate mainly include image information captured by a camera. If the first sensing information or the third sensing information is configured to include detection information detected by, for example, an infrared sensor, a laser sensor, a thermal sensor, a microphone, an ultrasonic sensor, a LiDAR, or a human sensor, it is possible to particularly improve the detection accuracy of a person or an animal. As a result, a more suitable article transfer candidate can be selected. Moreover, it is desirable that the third sensing information used for selecting the article transfer candidate mainly includes image information captured by a camera. If the third sensing information is configured to include detection information detected by, for example, a wind speed sensor, the wind speed of a portion close to the ground (for example, a portion within several meters from the ground) can be set as a condition for selecting the article transfer candidate. Therefore, a space where the wind speed is equal to or higher than the threshold (for example, a space with a strong building wind) can be excluded from the search target, so that a more suitable article transfer candidate can be selected.

Figure 6:
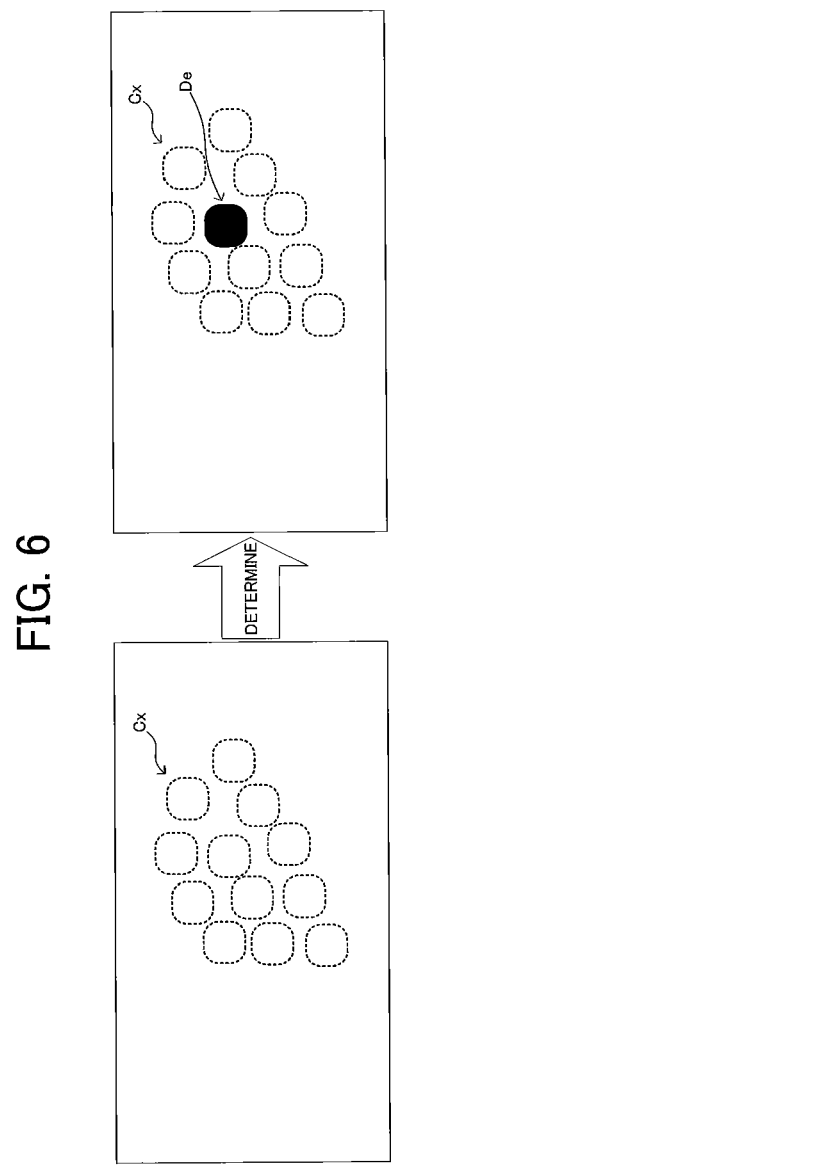
FIG. 6 is a conceptual diagram illustrating a first example in which an article transfer place is determined with reference to article transfer candidates.
Figure 7:
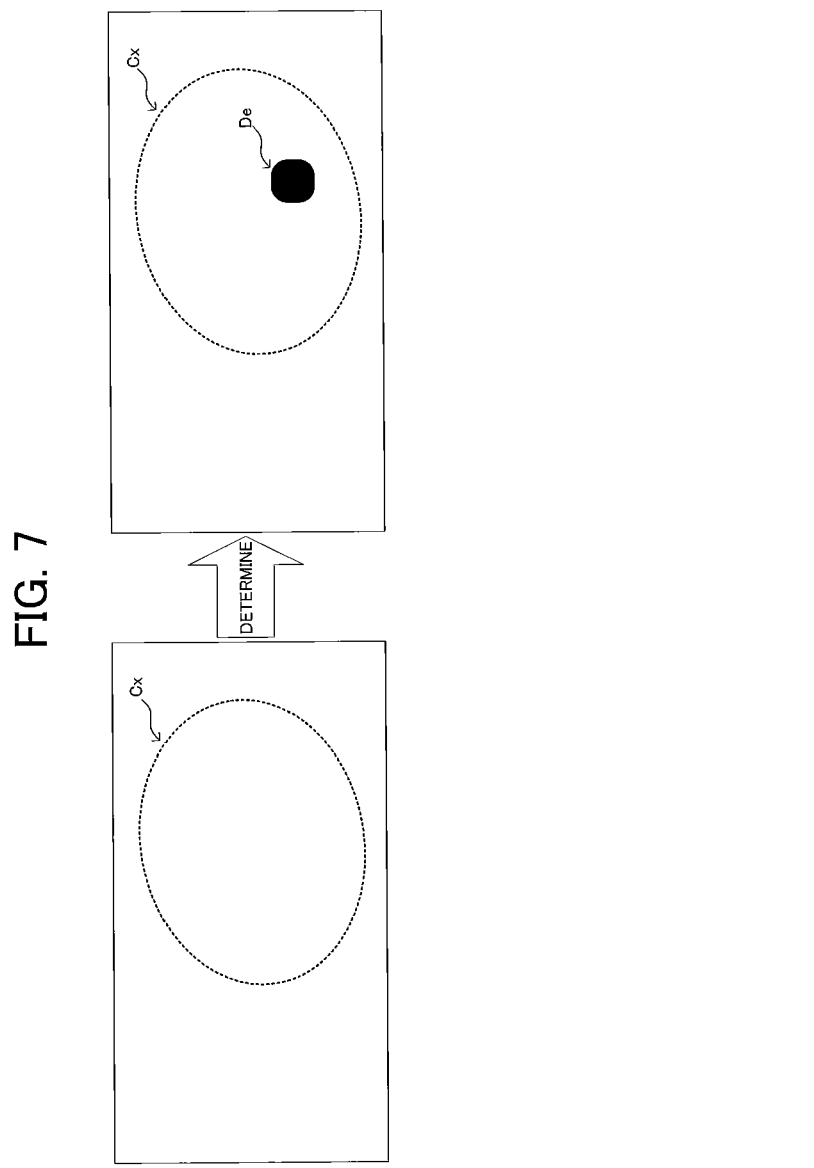
FIG. 7 is a conceptual diagram illustrating a second example in which an article transfer place is determined with reference to article transfer candidates.
Figure 8:
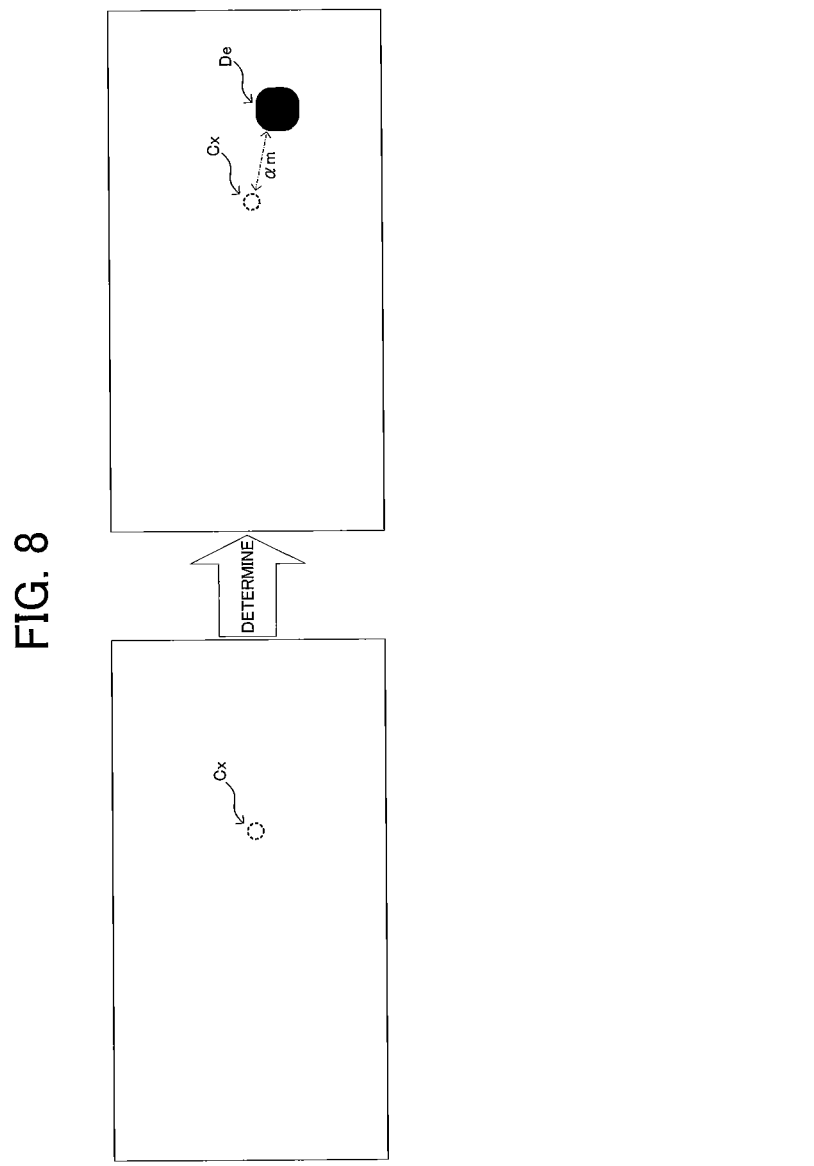
FIG. 8 is a conceptual diagram illustrating a third example in which an article transfer place is determined with reference to article transfer candidates.

The transfer place determination unit 33e determines one article transfer place with reference to the article transfer candidate selected by the transfer candidate selection unit 33d on the basis of the second sensing information acquired by the sensing information acquisition unit 33c. FIGS. 6 to 8 are conceptual diagrams illustrating first to third examples in which the article transfer place is determined with reference to the article transfer candidates. In the example of FIG. 6, one article transfer place De is determined from a plurality of article transfer candidates Cx. Incidentally, some of the plurality of article transfer candidates Cx may overlap each other. On the other hand, in the example of FIG. 7, an article transfer place De of a narrower range (area) than the article transfer candidate Cx is determined from one article transfer candidate Cx. On the other hand, in the example of FIG. 8, an article transfer place De at a place am away from one article transfer candidate Cx is determined.

Herein, a specific example of a determining method of an article transfer place will be described. For example, the transfer place determination unit 33e generates a plurality of mapping image data representing a situation extracted from the second sensing information in a time series. Each point of the mapping image data is associated with latitude and longitude. Then, the transfer place determination unit 33e searches for a space where no obstacle exists on the ground and in the sky in the same range as the article transfer candidate Cx from among the plurality of article transfer candidates Cx, as illustrated in FIG. 6, on the basis of the generated mapping image data. Alternatively, the transfer place determination unit 33e searches for a space where no obstacle exists on the ground and in the sky in a narrower range than one article transfer candidate Cx, as illustrated in FIG. 7, on the basis of the generated mapping image data. Alternatively, the transfer place determination unit 33e searches for a space where no obstacle exists on the ground and in the sky in a range am away from one article transfer candidate Cx, as illustrated in FIG. 8, on the basis of the generated mapping image data. Then, as illustrated in FIGS. 6 to 8, the transfer place determination unit 33e determines the searched space or a point in the searched space as the article transfer place De. According to this configuration, a safer article transfer place can be determined. Incidentally, the transfer place determination unit 33e acquires the position information of the determined article transfer place De.

Moreover, the transfer place determination unit 33e may determine one article transfer place De with reference to the article transfer candidate Cx on the basis of the third sensing information acquired by the sensing information acquisition unit 33c, in addition to the second sensing information acquired by the sensing information acquisition unit 33c. In this case, the transfer place determination unit 33e generates a plurality of pieces of mapping image data representing the situation extracted from the second sensing information and the situation extracted from the third sensing information in time series. Then, on the basis of the generated mapping image data, the transfer place determination unit 33e searches for a space where no obstacle exists on the ground and in the sky with reference to the article transfer candidate Cx as illustrated in FIGS. 6 to 8. And then, the transfer place determination unit 33e determines the searched space or a point in the searched space as the article transfer place De, and acquires the position information of the determined article transfer place De.

Moreover, the transfer place determination unit 33e may determine one article transfer place De with reference to the article transfer candidate Cx on the basis of the first sensing information acquired by the sensing information acquisition unit 33c, in addition to the second sensing information acquired by the sensing information acquisition unit 33c (or the second sensing information and the third sensing information). In this case, the transfer place determination unit 33e generates a plurality of pieces of mapping image data representing the situation extracted from the second sensing information and the situation extracted from the first sensing information in time series. Then, on the basis of the generated mapping image data, the transfer place determination unit 33e searches for a space where no obstacle exists on the ground and in the sky with reference to the article transfer candidate Cx as illustrated in FIGS. 6 to 8, determines the searched space or a point in the searched space as the article transfer place De, and acquires the position information of the determined article transfer place De. Moreover, since the situation may change while the UGV 2 is moving, the transfer place determination unit 33e may perform the first sensing again at a time after the UGV 2 moves, and uses the first sensing information to determine the article transfer place, so that the accuracy is increased.

Incidentally, the transfer place determination unit 33e may refer to the map data corresponding to the latitude and longitude with respect to the generated mapping image data, as in the transfer candidate selection unit 33d, so that buildings, roads, sidewalks, and off-limits sections or the like may be excluded from the search target. Moreover, the transfer place determination unit 33e may search for a space that has at least extent where the UGV 2 can stop and that the UGV 2 can stop for a predetermined time (for example, a time until the completion of article transfer). According to this configuration, a safer article transfer place can be determined.

Further, the transfer place determination unit 33e determines the article transfer place on the basis of the past transfer history, in addition to the second sensing information acquired by the sensing information acquisition unit 33c (or at least any one of the first sensing information and the third sensing information). In this case, for example, the transfer place determination unit 33e refers to the history information stored in the storage unit 32, excludes the article transfer candidate that has not been determined as the article transfer place from the article transfer candidates selected in the past, and determine the article transfer place among the article transfer candidates that has not been excluded. At this time, the excluded article transfer candidate may be an article transfer candidate whose frequency not determined as the article transfer place is equal to or higher than a threshold. Moreover, the history information referred to by the transfer place determination unit 33e may be history information indicating that the article transfer place is determined within a predetermined time zone (for example, 9:00 to 12:00) including the time (current time) when determining the article transfer place.

Incidentally, it is desirable that the second sensing information and the third sensing information (or the first sensing information) used for determining the article transfer place mainly include image information captured by a camera. If the second sensing information or the third sensing information (or the first sensing information) is configured to include detection information detected by, for example, an infrared sensor, a laser sensor, a thermal sensor, a microphone, an ultrasonic sensor, a LiDAR, or a human sensor, it is possible to particularly improve the detection accuracy of a person or an animal. As a result, a more suitable article transfer place can be determined. Moreover, it is desirable that the second sensing information and the third sensing information used for determining the article transfer place mainly includes image information captured by a camera. If the second sensing information or the third sensing information is configured to include detection information detected by, for example, a wind speed sensor, the wind speed of a portion close to the ground (for example, a portion within several meters from the ground) can be set as a condition for determining the article transfer place. Therefore, a space where the wind speed is equal to or higher than the threshold (for example, a space with a strong building wind) can be excluded from the search target, so that a more suitable article transfer place can be determined.

In a case where the UAV 1 and the UGV 2 arrive at the article transfer place determined by the transfer place determination unit 33e and the article transfer preparation is completed, the transfer instruction unit 33f transmits an article transfer instruction to the UAV 1 which performs the article transfer via the communication unit 31. The article transfer instruction is an instruction message for causing an article to be transferred between the UAV 1 and the UGV 2 at the determined article transfer place.

[2. Operation of Article Transfer System S]

Figure 9:
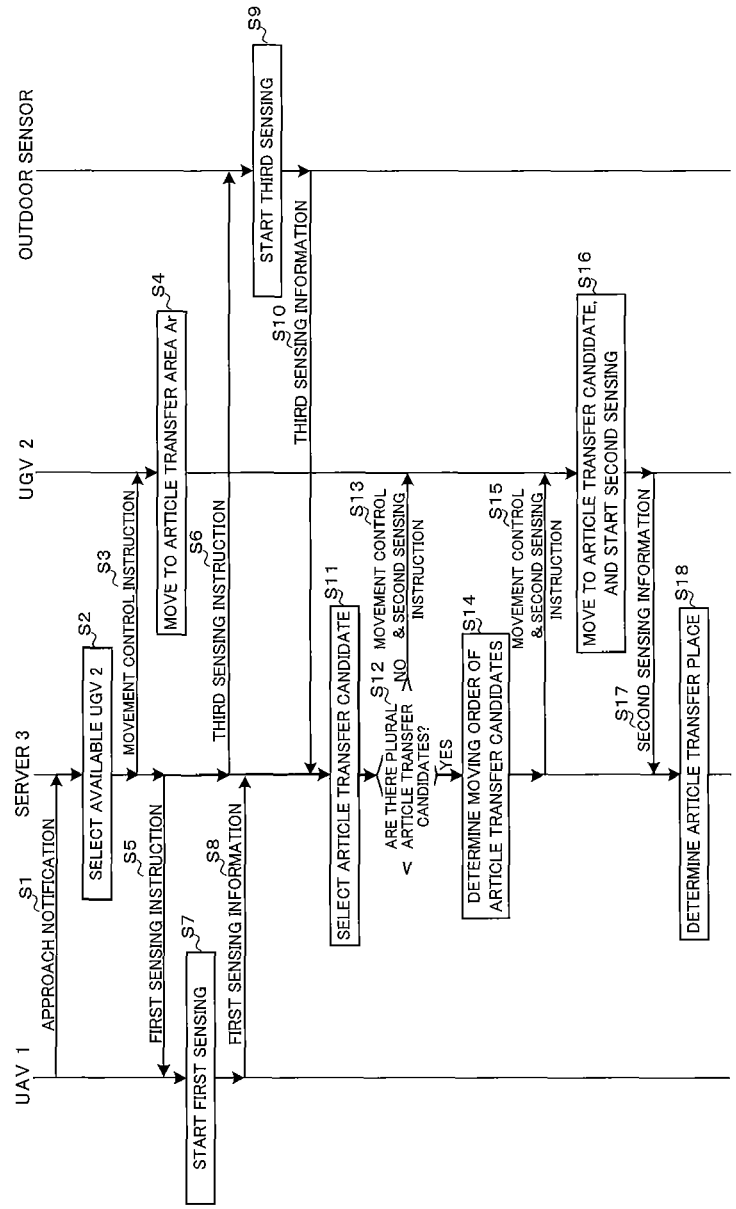
FIG. 9 is a sequence diagram illustrating an example of an operation of an article transfer system S from when an UAV 1 approaches an article transfer area Ar to when an article transfer place is determined.
Figure 10:
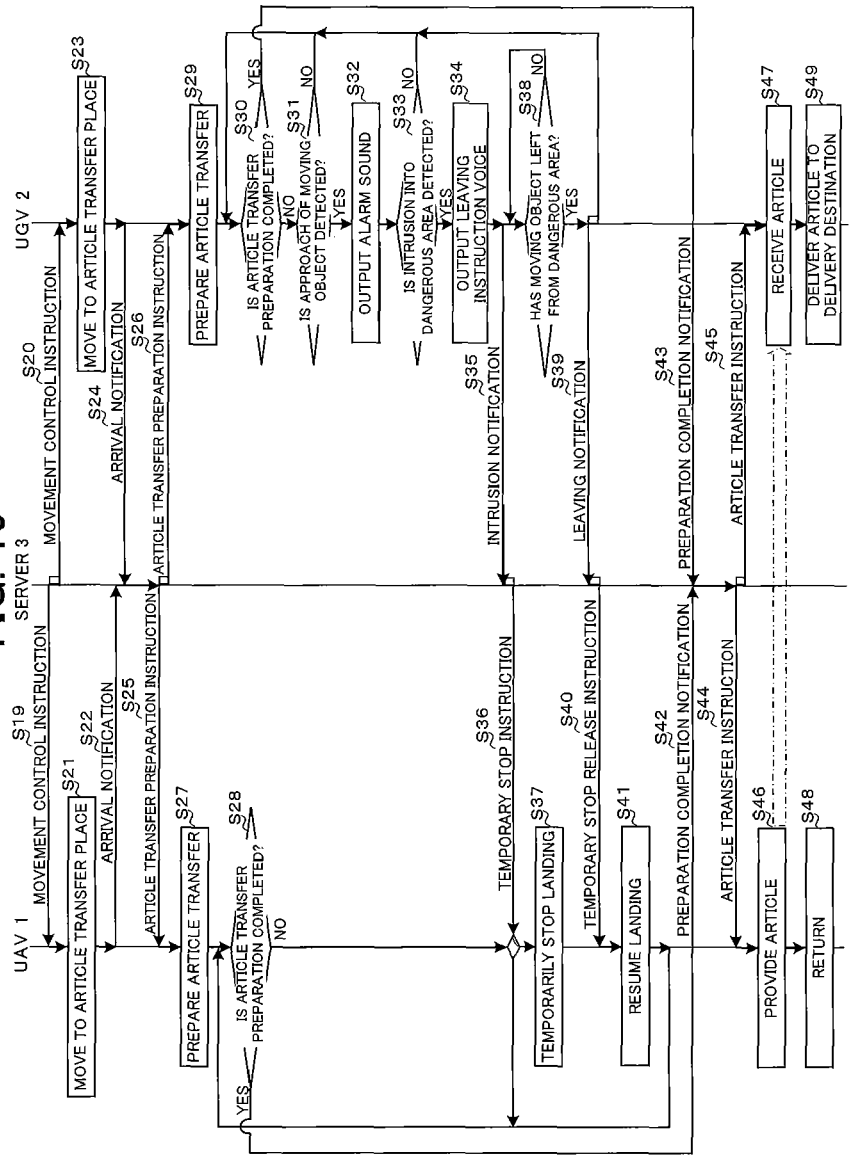
FIG. 10 is a sequence diagram illustrating an example of an operation of an article transfer system S from a determination of an article transfer place to a delivery of an article.
Figure 11:
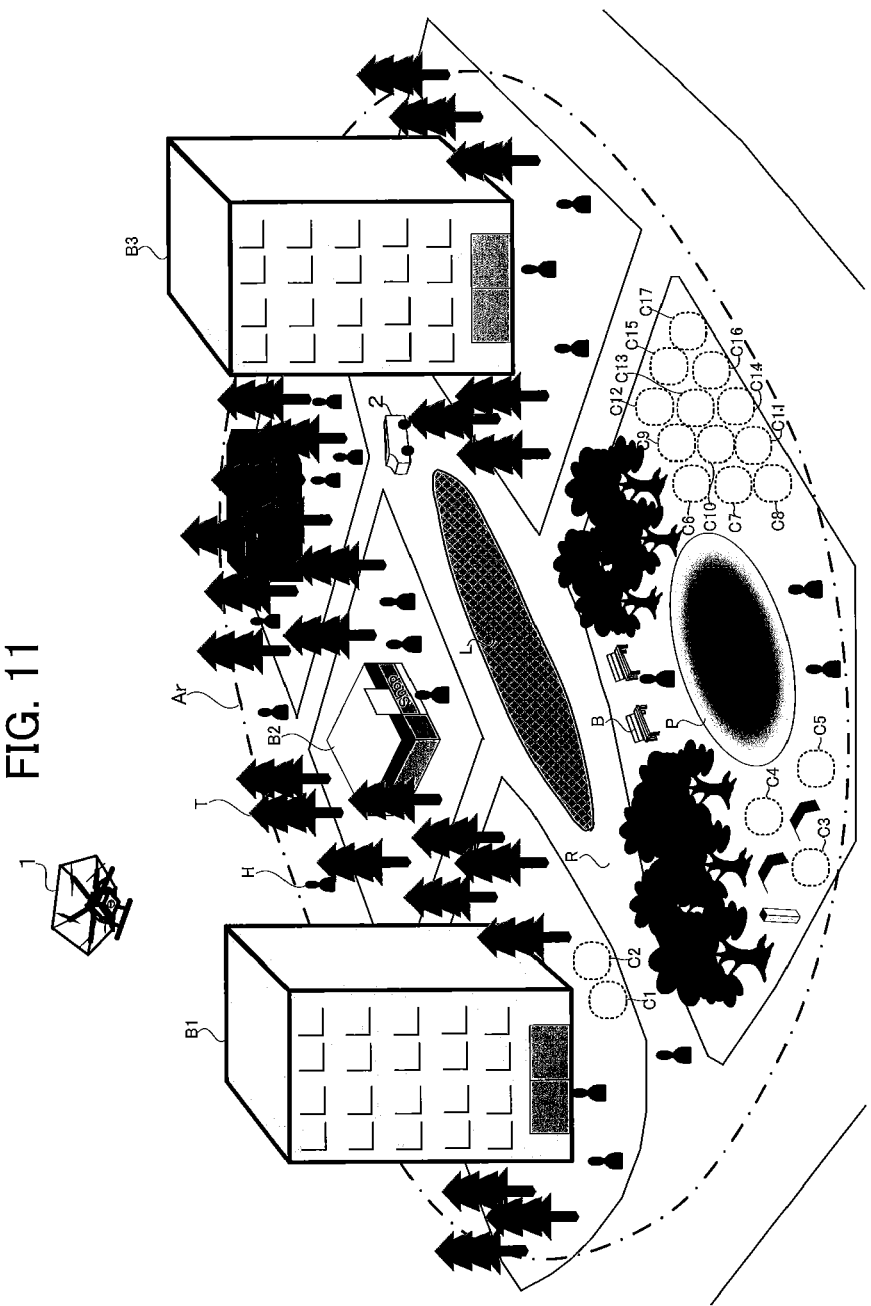
FIG. 11 is a conceptual diagram illustrating a situation in an article transfer area Ar.

Next, an example of an operation of the article transfer system S according to this embodiment will be described with reference to FIGS. 9 to 11. FIG. 9 is a sequence diagram illustrating an example of the operation of the article transfer system S from when the UAV 1 approaches an article transfer area Ar to when the article transfer place is determined. FIG. 10 is a sequence diagram illustrating an example of the operation of the article transfer system S from the determination of the article transfer place to the delivery of the article. FIG. 11 is a conceptual diagram illustrating a situation in the article transfer area Ar. Incidentally, in the following operation example, it is assumed that the article is transferred from the UAV 1 to the UGV 2, and then the article is delivered to the delivery destination by the UGV 2.

In FIG. 9, when the UAV 1 approaches within, for example, several tens of meters of the article transfer area Ar, the UAV 1 transmits an approach notification to the server 3 (Step S1). This approach notification is approach information indicating that the UAV 1 has approached the article transfer area Ar. Incidentally, the position information of the article transfer area Ar is indicated, for example, in the flight scheduled route in the flight plan information.

Next, upon receiving the approach notification from the UAV 1, the server 3 selects an available UGV 2 from among a plurality of UGVs 2 provided in a delivery machine yard near the article transfer area Ar (Step S2). By this configuration, the pair of the UAV 1 and the UGV 2 for performing the article transfer is determined, and the aircraft ID of the UAV 1 and the aircraft ID of the UGV 2 are linked. Next, the server 3 transmits the movement control instruction for moving the UGV 2 to the article transfer area Ar together with the position information of the article transfer area Ar to the UGV 2 selected in Step S2 (Step S3).

Next, upon receiving the movement control instruction from the server 3, the UGV 2 moves from the delivery machine yard to the article transfer area Ar according to the position information of the article transfer area Ar (Step S4). Incidentally, in a case where the UGV 2 is already in the article transfer area Ar, the UGV 2 waits on the spot.

Next, the server 3 transmits the first sensing instruction to the UAV 1 (Step S5). Further, the server 3 transmits the third sensing instruction to the outdoor sensor (Step S6). Incidentally, in a case where a plurality of outdoor sensors is installed in the article transfer area Ar, the server 3 may transmit the third sensing instruction to each outdoor sensor.

Next, upon receiving the first sensing instruction from the server 3, the UAV 1 starts the first sensing in the article transfer area Ar (Step S7). The first sensing is continued until, for example, the transfer of the article is completed. Incidentally, the first sensing may be performed while moving over the article transfer area Ar, or may be performed while hovering. Next, the UAV 1 transmits the first sensing information obtained from the first sensing to server 3 together with the aircraft ID of the UAV 1 (Step S8).

On the other hand, upon receiving the third sensing instruction from the server 3, the outdoor sensor starts the third sensing in the article transfer area Ar (Step S9). The third sensing is continued, for example, until the article transfer is completed. Next, the outdoor sensor transmits the third sensing information obtained from the third sensing to the server 3 (Step S10).

Next, by receiving the first sensing information from the UAV 1 and the third sensing information from the outdoor sensor, the server 3, acquires the first sensing information and the third sensing information, for example, in a predetermined time range. Then, the server 3 selects one or more article transfer candidates on the basis of the acquired first sensing information and third sensing information as described above (Step S11).

FIG. 11 illustrates an example in which a plurality of article transfer candidates C1 to C17 is selected. In the example of FIG. 11, buildings B1 to B3, a person H, a tree T, a road R, a bench B, a pond P, a restricted area L, and the like are determined as obstacles, and the space where the obstacle exists (that is, a place where the obstacle exists, and the area in the vicinity) is not selected as an article transfer candidate. Incidentally, in the example of FIG. 11, the extent of the article transfer candidates C1 to C17 are uniform, but the extent of the article transfer candidates C1 to C17 may be different.

Next, the server 3 determines whether a plurality of article transfer candidates has been selected (Step S12). In a case where it is determined that the plurality of article transfer candidates is not selected (Step S12: NO), the server 3 transmits the movement control instruction to move the UGV 2 to the article transfer candidate and the second sensing instruction to the UGV 2, together with the position information of the article transfer candidate selected in Step S1*l* (Step S13).

On the other hand, in a case where it is determined that the plurality of article transfer candidates has been selected (Step S12: YES), the server 3 determines a moving order of the article transfer candidates according to the predetermined criterion (Step S14). Then, the server 3 transmits the movement control instruction to move the UGV 2 to the article transfer candidates in the moving order determined in Step S14 and the second sensing instruction to the UGV 2, together with the positional information of each of the plurality of article transfer candidates selected in Step S1*l* (Step S15).

Next, upon receiving the movement control instruction and the second sensing instruction from the server 3, the UGV 2 moves to the article transfer candidate selected in Step S1*l* according to the position information of the article transfer candidate, and starts the second sensing in the article transfer area Ar (Step S16). That is, the area around the UGV 2 (including the sky) is sensed. The second sensing is continued, for example, until the article transfer is completed. Then, the UGV 2 transmits the second sensing information obtained from the second sensing to server 3 together with the aircraft ID of the UGV 2 (Step S17).

Incidentally, in a case where the received movement control instruction indicates the moving order, the UGV 2 performs the second sensing while moving the article transfer candidates in the moving order. By this configuration, it is possible to more efficiently determine the article transfer place. For example, in FIG. 11, in a case where the delivery destination of the article is in the building B1, and the determined moving order is the order of the article transfer candidates closer to the delivery destination, the UGV 2 moves in the order of the article transfer candidates closer to the delivery destination of the article. In this case, the UGV 2 first moves to the article transfer candidate C1 or C2 in FIG. 11. By this configuration, it is possible to deliver the article to the delivery destination more quickly. Moreover, in a case where the determined moving order is the order of the article transfer candidates closer to the current position of the UGV 2, the UGV 2 moves in the order of the article transfer candidates closer to its own current position. In this case, the UGV 2 first moves to the article transfer candidate C12 in FIG. 11. According to this configuration, it is possible to more quickly determine the article transfer place.

Moreover, in a case where the determined moving order is a moving order according to the density of the article transfer candidates, the UGV 2 moves in the moving order according to the density of the article delivering candidates. Herein, the moving order according to the density means that, for example, an area having a higher density is prioritized. For example, in FIG. 11, the area including the article transfer candidates C6 to C17 has a higher density than the area including the article transfer candidates C1 and C2 and the area including the article transfer candidates C3 to C5. Therefore, in this case, the UGV 2 first moves to the area including the article transfer candidates C6 to C17. Therefore, it is possible to determine an article transfer place that is estimated to be more secure.

Next, when the server 3 receives the second sensing information from the UGV 2 and obtains, for example, the second sensing information within a predetermined time range, the server 3 determines the article transfer place, as described above, on the basis of the obtained second sensing information (Step S18). Incidentally, the server 3 may also acquire the third sensing information from the outdoor sensor, and determine the article transfer place on the basis of the acquired second sensing information and the acquired third sensing information.

Next, in FIG. 10, the server 3 transmits, to the UAV 1, the movement control instruction to move the UAV 1 to the article transfer place together with the position information of the article transfer place determined in Step S18 (Step S19). Further, the server 3 transmits, to the UGV 2, the movement control instruction for moving the UGV 2 to the article transfer place together with the position information of the article transfer place determined in Step S18 (Step S20).

Next, upon receiving the movement control instruction from the server 3, the UAV 1 moves to the article transfer place according to the position information of the article transfer place (Step S21). Next, when the UAV 1 arrives over the article transfer place, the UAV 1 transmits an arrival notification to the server 3 (Step S22). This arrival notification is arrival information indicating that the vehicle has arrived at the article transfer place.

On the other hand, upon receiving the movement control instruction from the server 3, the UGV 2 moves to the article transfer place according to the position information of the article transfer place (Step S23). Incidentally, in a case where the UGV 2 is already at the article transfer place, the UGV 2 stays there. Then, when arriving at the article transfer place, the UGV 2 sends an arrival notification to the server 3 (Step S24).

Next, upon receiving the arrival notification from the UAV 1 and the UGV 2, the server 3 transmits an article transfer preparation instruction to the UAV 1 (Step S25), and transmits an article transfer preparation instruction to the UGV 2 (Step S26).

Next, upon receiving the article transfer preparation instruction from the server 3, the UAV 1 performs an article transfer preparation (Step S27). For example, in the article transfer preparation, the UAV 1 makes a landing on the UGV 2. Then, the UAV 1 determines whether the article transfer preparation has been completed (Step S28). For example, in a case where the landing on the UGV 2 is completed, it is determined that the article transfer preparation is completed.

On the other hand, upon receiving the article transfer preparation instruction from the server 3, the UGV 2 performs an article transfer preparation (Step S29). For example, in the article transfer preparation, the UGV 2 opens an article carry-in port provided at the upper part of the UGV 2. By this configuration, the UGV 2 is set in a state in which the article can be received from the article carry-in port. Then, the UGV 2 determines whether the article transfer preparation is completed (Step S30). For example, in a case where it is set to a state in which article can be received and the safety of the surroundings is confirmed, it is determined that the article transfer preparation have been completed.

If the UGV 2 detects an approach of a moving object (for example, a person) to the article transfer place until the article transfer preparation is completed (for example, detected in the second sensing) (Step S31: YES), the UGV 2 outputs an alarm sound from the speaker (Step S32). Next, if the UGV 2 detects an intrusion into a dangerous area by the detected approaching moving object (for example, within a predetermined distance from the article transfer place) (Step S33: YES), the UGV 2 outputs a leaving instruction voice to the moving object from the speaker (Step S34), and transmits an intrusion notification to the server 3 (Step S35). This intrusion notification is intrusion information indicating that the moving object has intruded into the dangerous area.

Next, upon receiving the intrusion notification from the UGV 2, the server 3 transmits a temporary stop instruction to the UAV 1 (Step S36). When the UAV 1 receives the temporary stop instruction from the server 3 until the completion of the article transfer preparation, the UAV 1 temporarily stops landing on the UGV 2 (Step S37). At this time, the UAV 1 may hover on the spot or move to a safe altitude.

Next, when the UGV 2 determines that the moving object has left the dangerous area (Step S38: YES), the UGV 2 transmits a leaving notification to the server 3 (Step S39). The leaving notification is leaving information indicating that the moving object has left the dangerous area. Next, upon receiving the leaving notification from the UGV 2, the server 3 transmits a temporary stop release instruction to the UAV 1 (Step S40). Next, upon receiving the temporary stop release instruction from the server 3, the UAV 1 resumes landing on the UGV 2 (Step S41).

Then, when the UAV 1 determines that the article transfer preparation is completed (Step S28: YES), the UAV 1 transmits a preparation completion notification to the server 3 (Step S42). This preparation completion notification is preparation completion information indicating that the article transfer preparation has been completed. On the other hand, when the UGV 2 determines that the article transfer preparation is completed (Step S30: YES), the UGV 2 transmits a preparation completion notification to the server 3 (Step S43).

Next, upon receiving the preparation completion notification from the UAV 1 and the UGV 2, the server 3 transmits the article transfer instruction to the UAV 1 (Step S44) and transmits the article transfer instruction to the UGV 2 (Step S45). Incidentally, the server 3 may transmit, to the UGV 2, the delivery destination information of the article transported by the UAV 1, together with the article transfer instruction. Alternatively, the UGV 2 may acquire the delivery destination information from the UAV 1 that has landed or the article mounted on the UAV 1. For example, a two-dimensional code (for example, a QR code (registered trademark)) containing the delivery destination information of the article may be displayed below the UAV 1 or the article, or an IC tag for storing the delivery destination information of the article may be attached.

Next, upon receiving the article transfer instruction from the server 3, the UAV 1 provides the article to the UGV 2 by separating (releaing) the article held by the article holding mechanism (Step S46). On the other hand, the UGV 2 receives the article provided by the UAV 1 from the article receiving port (Step S47). Thus, the article transfer between the UAV 1 and the UGV 2 is completed at the article transfer place.

Figure 12:
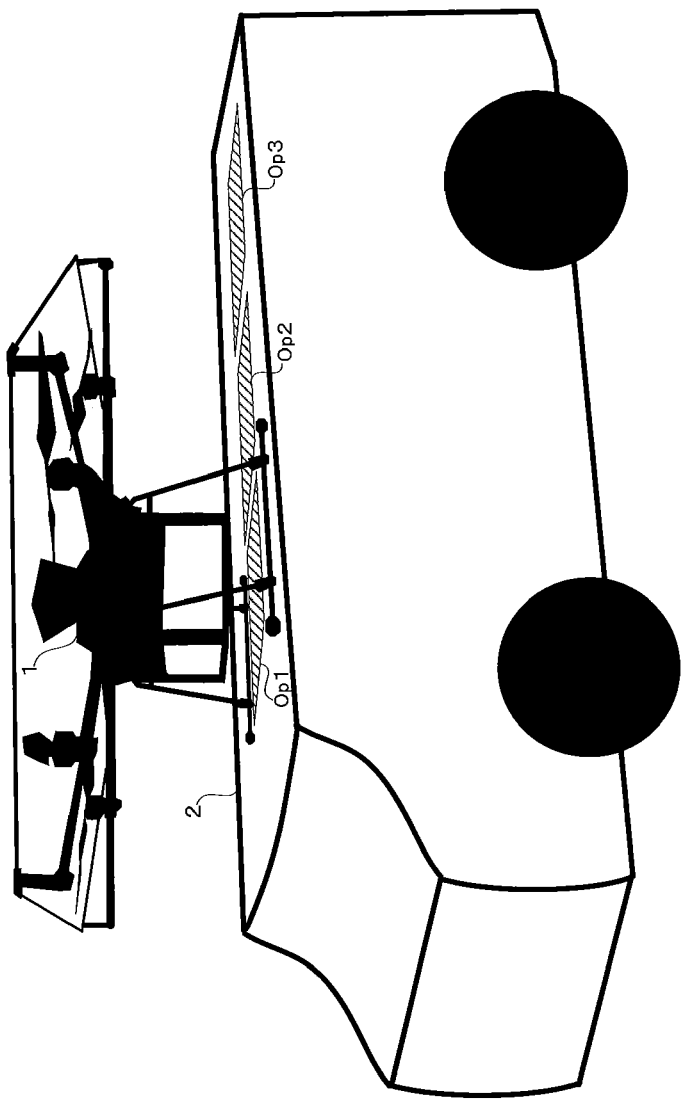
FIG. 12 is a diagram illustrating a state where an UAV 1 is landing on an UGV 2 at an article transfer place.

FIG. 12 is a diagram illustrating a state where the UAV 1 is landing on the UGV 2 at the article transfer place. The upper part of the UGV 2 illustrated in FIG. 12 is provided with three article receiving ports Op1 to Op3, and articles can be introduced from the respective article receiving ports Op1 to Op3. In the example of FIG. 12, after the article receiving port Op1 of the UGV 2 is opened, the article held in the UAV 1 is separated, so that the articles are carried in and held from the article receiving port Op1.

Next, when the article transfer is completed, the UAV 1 returns to, for example, the starting point (Step S48). On the other hand, when the article transfer is completed, the UGV 2 autonomously moves on the ground on the basis of the delivery destination information of the article and delivers the article to the delivery destination (Step S49). Thus, the article transported by the UAV 1 is delivered to the delivery destination by the UGV 2. Incidentally, the delivery destination may be the home of the recipient of the article or the entrance of the office, or a delivery box installed at a place away from the entrance of the recipient or the office of the recipient (a storage box for temporarily storing the articles). Alternatively, the delivery destination may be the recipient of the article.

As described above, according to the above-described embodiment, the article transfer system S selects an article transfer candidate on the basis of the first sensing information obtained from the first sensing performed by the UAV 1 in flight, performs the movement control of the UGV 2 on the basis of the position information of the selected article transfer candidate, and determines the article transfer place with reference to the selected article transfer candidate on the basis of the second sensing information obtained from the second sensing performed by the UGV 2. Therefore, even in a case where there is no dedicated transfer facility, it is possible to secure a transfer place where the article transfer can be safely performed between the UAV 1 and the UGV 2, and the article transfer between the UAV 1 and the UGV 2 can be performed at a safer article transfer place. Moreover, the cost for setting up a dedicated transfer facility can be reduced.

Incidentally, in the above operation example, an example in which an article is transferred from the UAV 1 to the UGV 2 has been described, but an article may be transferred from the UGV 2 to the UAV 1. Also in this case, the operations in Steps S1 to S45 in the above operation example are performed in the same manner. However, the UGV 2 sets the article to be transported by opening the article receiving port (article loading port) provided at the upper part of the UGV 2 in the article transfer preparation in Step S29. Then, the UGV 2 slides a holding table (mounting table) for holding the article upward to cause the article to protrude from the article loading port. By this configuration, the article is provided. On the other hand, the UAV 1 holds the article provided on the holding table of the UGV 2 by, for example, an article holding hook. Thus, the article transfer between the UAV 1 and the UGV 2 is completed at the article transfer place. Thereafter, the UAV 1 delivers the article to the delivery destination by flying autonomously on the basis of the delivery destination information of the article. On the other hand, the UGV 2 returns to, for example, the delivery machine yard.

Moreover, in the above operation example, the description has been given about an example in which the article transfer is performed when the UAV 1 lands on the UGV 2. However, the article transfer may be performed by a transfer method using a reel mounted on the UAV 1, for example. In a case where the article is transferred from the UAV 1 to the UGV 2, the UAV 1 extends a wire of the reel toward the UGV 2 while hovering over the UGV 2 so as to vertically lower the article held by the article holding hook at the tip of wire. Then, the UAV 1 separates the article when the article reaches the UGV 2 (the article transfer preparation is completed). By this configuration, the article is carried in from the article receiving port of the UGV 2. On the other hand, in a case where the article is transferred from the UGV 2 to the UAV 1, the UAV 1 extends the wire of the reel toward the UGV 2 while hovering above the UGV 2, and vertically lowers the article holding hook at the tip of the wire. Then, when the article holding hook reaches the UGV 2 (the article transfer preparation is completed), the UAV 1 holds the article provided on the holding table of the UGV 2 with the article holding hook, and then winds the reel wire. As described above, even when the article transfer is performed by the transfer method using the reel, since the article transfer place where there is no obstacle that contacts the wire of the reel above the UGV 2 is determined at least through the second sensing, a safe article transfer can be performed.

Moreover, in the above operation example, the description has been given about an example in which the process of selecting the article transfer candidate and the process of determining the article transfer place are performed by the server 3. However, these processes may be configured to be performed by the UAV 1 or the UGV 2. In such a configuration, the UAV 1 and the UGV 2 exchange various information by wireless communication. Moreover, the process of selecting an article transfer candidate and the process of determining an article transfer place may be individually performed by separate devices (for example, the process of selecting an article transfer candidate is performed by the UAV 1, and the process of determining an article transfer place is the UGV 2).

Moreover, in the above embodiment, the description has been given about an application of "determining method of article transfer place" which is performed by the article transfer system (in other words, one or more computers included in the system S) according to an embodiment of the present invention. However, the present invention may be applied even to a determining method of a landing place for the UAV 1 to land on the UGV 2. This determining method of the landing place is performed by a landing system (in other words, one or more computers included in the system S), and is configured to include a selection step of selecting a candidate of the landing place for the UAV 1 to land on the UGV 2 on the basis of the first sensing information obtained from the first sensing performed by the UAV 1 in flight, a control step of performing the movement control of the UGV 2 on the basis of information of the selected candidate, and a determination step of determining a landing place with reference to the selected candidate on the basis of the second sensing information obtained from the second sensing performed by the UGV 2. According to such a configuration, even in a case where there is no dedicated landing facility, it is possible to secure a landing place where the UAV 1 can safely land on the UGV 2, and to reduce the costs for setting up a dedicated landing facility. With this configuration, for example, the UGV 2 may be provided with a large capacity battery, and safely supply power to the UAV 1 that has landed on the UGV 2 (the connector may be connected and supplied with power at the time of landing, or may be a contactless power supply). Incidentally, in such a determining method of a landing place, the terms "article transfer" and "transfer" described in the above embodiment are replaced with "landing" (for example, "article transfer candidate" is replaced with "landing candidate", "article transfer place" to "landing place", "obstacles that obstruct the article transfer" to "obstacles that obstruct landing", and "past transfer history" to "past landing history"), each of the processes performed in the above-described embodiment is applied by replacing these terms.

APPENDIX

In the determination step, a search may be made for a space where the UGV 2 can stop for a predetermined time or more with reference to the landing candidate, and the searched space or a point in the searched space may be determined as the landing place. Moreover, in the determination step, a search is made for a space in which an obstacle to landing does not exist on the ground and in the sky with reference to the landing candidate, and the searched space or a point in the searched space may be determined as the landing place. Moreover, in the determination step, the landing place may be determined on the basis of the second sensing information obtained from the second sensing while the UGV 2 is moving according to the movement control of the UGV 2. Moreover, in the determination step, the landing place may be determined on the basis of the third sensing information obtained from the third sensing performed by the sensor installed on the ground in addition to the second sensing information obtained from the second sensing. Moreover, in the determination step, the landing place may be determined on the basis of the past landing history in addition to the second sensing information obtained from the second sensing.

Moreover, in the selection step, a search may be made for a space where the UGV 2 can stop for a predetermined time or longer, and the searched space or a point in the space may be selected as the landing candidate. Moreover, in the selection step, a search is made for a space in which an obstacle to the landing does not exist on the ground and in the sky, and the searched space or a point in the space may be selected as the landing candidate. Moreover, in the selection step, the landing candidate may be selected on the basis of the third sensing information obtained from the third sensing performed by the sensor installed on the ground in addition to the first sensing information obtained from the first sensing. Moreover, in the selection step, the landing candidate may be selected on the basis of the past landing history in addition to the first sensing information obtained from the first sensing. Moreover, in the selection step, a plurality of the landing candidates may be selected on the basis of the first sensing information obtained from the first sensing, and in the control step, the UGV 2 may be controlled to move in an order of the landing candidates according to a predetermined criterion. As an example of the order of the landing candidates according to the predetermined criterion, there are the order of the landing candidates closer to the delivery destination of the article, the order of the landing candidate near the current position of the UGV 2, and the moving order according to the density of the plurality of landing candidates. Moreover, in a case where the approach of the moving object to the landing place is detected, an alarm may be output.

Incidentally, it should be noted that the foregoing embodiment is one embodiment of the present invention and does not limit the present invention accordingly; and any change, addition, or modification of the foregoing embodiment appropriately made within the spirit of the present invention will naturally fall within the technical scope of the present invention.

REFERENCE SIGNS LIST

1 UAV
2 UGV
3 Server
11, 21 Drive unit
12, 22 Positioning unit
13, 23 Radio communication unit
14, 24 Imaging unit
15, 25 Control unit
31 Communication unit
32 Storage unit
33 Information processing unit
33a Sensing instruction unit
33b Movement control instruction unit
33c Sensing information acquisition unit
33d Transfer candidate selection unit
33e Transfer place determination unit
33f Transfer instruction unit
S Article transfer system

The invention claimed is:

1. A control method performed by a system which includes a control unit that controls an unmanned ground vehicle, comprising:
    selecting, based at least in part on information obtained from first sensing of observing a state of surroundings of at least one of an atmosphere and a ground performed by an unmanned aerial vehicle in flight, a candidate ground location for determining one of:
        an article transfer place, determined relative to a ground location, for a transfer performed between the unmanned aerial vehicle and the unmanned ground vehicle, and
        a landing place, determined relative to a ground location, for the unmanned aerial vehicle to land on the unmanned ground vehicle;
    performing a movement control of the unmanned ground vehicle based at least in part on information of the selected candidate ground location; and
    determining the article transfer place or the landing place with reference to the selected candidate ground location, the determination based at least in part on information obtained from second sensing performed by the unmanned ground vehicle of surroundings of the unmanned ground vehicle,
    wherein the selecting of the candidate ground location comprises:
        selecting a plurality of first candidate ground locations and a plurality of second candidate ground locations for the article transfer place or the landing place, the first candidate ground locations being located in a first area, the second candidate ground locations being located in a second area, and
        determining a density of candidate ground locations in each of the first area and the second area, and
    wherein the performing of the movement control comprises controlling the unmanned ground vehicle to move preferentially toward one of the first area and the second area according to a greatest density of candidate ground locations.

2. The control method according to claim 1, wherein a search is made for a space where the unmanned ground vehicle can stop for a predetermined time or more with reference to the candidate ground location, and the searched space or a point in the searched space is determined as the article transfer place or the landing place.

3. The control method according to claim 1, wherein a search is made for a space in which ground and sky surroundings are free of obstacles with reference to the candidate ground location, and the searched space or a point in the searched space is determined as the article transfer place or the landing place.

4. The control method according to claim 1, wherein the article transfer place or the landing place is determined based at least in part on the information obtained from the second sensing while the unmanned ground vehicle is moving according to the movement control.

5. The control method according to claim 1, wherein the article transfer place or the landing place is determined based at least in part on information obtained from third sensing performed by a sensor installed on the ground.

6. The control method according to claim 1, wherein the article transfer place or the landing place is determined based at least in part on a past transfer history or a past landing history.

7. The control method according to claim 1, wherein a search is made for a space where the unmanned ground vehicle can stop fora predetermined time or more, and the searched space or a point in the searched space is selected as the candidate ground location.

8. The control method according to claim 1, wherein a search is made fora space in which ground and sky surroundings are free of obstacles, and the searched space or a point in the searched space is selected as the candidate ground location.

9. The control method according to claim 1, wherein the candidate ground location is selected based at least in part on information obtained from third sensing performed by a sensor installed on the ground.

10. The control method according to claim 1, wherein the candidate ground location is determined based at least in part on a past transfer history or a past landing history.

11. The control method according to claim 1,
wherein a plurality of candidate ground locations for the article transfer place or the landing place is selected, and
wherein the unmanned ground vehicle is controlled to move toward at least one of the candidate ground locations in an order determined according to a predetermined criterion.

12. The control method according to claim 11, wherein the predetermined criterion is a proximity to a delivery destination of the article.

13. The control method according to claim 11, wherein the predetermined criterion is a proximity to a current position of the unmanned ground vehicle.

14. The control method according to claim 11, wherein the predetermined criterion is a density of surrounding candidate ground locations.

15. The control method according to claim 1, further comprising causing the unmanned aerial vehicle to fly to the determined article transfer place or landing place.

16. The control method according to claim 1, further comprising causing the unmanned aerial vehicle and the unmanned ground vehicle to perform an article transfer at the determined article transfer place or landing place.

17. The control method according to claim 1, further comprising outputting an alarm in a case where an approach of a moving object to the determined article transfer place or landing place is detected.

18. An article transfer system which includes an unmanned aerial vehicle and an unmanned ground vehicle, comprising:
at least one memory configured to store computer program code; and
at least one processor configured to access the computer program code and operate as instructed by the computer program code, the computer program code including:
selection code configured to cause at least one of the at least one processor to select, based at least in part on information obtained from first sensing of observing a state of surroundings of at least one of an atmosphere and a ground performed by an unmanned aerial vehicle in flight, a candidate ground location for determining for one of:
an article transfer place, determined relative to a ground location, for a transfer performed between the unmanned aerial vehicle and the unmanned ground vehicle, and
a landing place, determined relative to a ground location, for the unmanned aerial vehicle to land on the unmanned ground vehicle;
movement control code configured to cause at least one of the at least one processor to cause the unmanned ground vehicle to perform a movement control based at least in part on information of the selected candidate ground location; and
location determination code configured to cause at least one of the at least one processor to determine the article transfer place or the landing place with reference to the selected candidate ground location, the determination based at least in part on information obtained from second sensing performed by the unmanned ground vehicle of surroundings of the unmanned ground vehicle,
wherein the selecting of the candidate ground location comprises:
selecting a plurality of first candidate ground locations and a plurality of second candidate ground locations for the article transfer place or the landing place, the first candidate ground locations being located in a first area, the second candidate ground locations being located in a second area, and
determining a density of candidate ground locations in each of the first area and the second area, and
wherein the performing of the movement control comprises controlling the unmanned ground vehicle to move preferentially toward one of the first area and the second area according to a greatest density of candidate ground locations.

19. A control method performed by a system which includes a control unit that controls at least one from among an unmanned aerial vehicle and an unmanned ground vehicle, comprising:
selecting, based at least in part on information obtained from first sensing of observing a state of surroundings of at least one of an atmosphere and a ground performed by an unmanned aerial vehicle in flight, a candidate ground location for determining one of:
an article transfer place, determined relative to a ground location, for a transfer performed between the unmanned aerial vehicle and the unmanned ground vehicle, and
a landing place, determined relative to a ground location, for the unmanned aerial vehicle to land on the unmanned ground vehicle;
determining the article transfer place or the landing place with reference to the selected candidate ground location, the determination based at least in part on information obtained from second sensing performed by the unmanned ground vehicle of surroundings of the unmanned ground vehicle; and causing the unmanned aerial vehicle to fly to the determined article transfer place or landing place, wherein the selecting of the candidate ground location comprises:

selecting a plurality of first candidate ground locations and a plurality of second candidate ground locations for the article transfer place or the landing place, the first candidate ground locations being located in a first area, the second candidate ground locations being located in a second area, and determining a density of candidate ground locations in each of the first area and the second area, and wherein the unmanned ground vehicle moves preferentially toward one of the first area and the second area according to a greatest density of candidate ground locations, prior to performing the second sensing.

\* \* \* \* \*